Sept. 20, 1971                    R. E. DOERFLER                    3,606,486
                            BRAKE INDICATING SAFETY VALVE
Filed Oct. 28, 1969                                            4 Sheets-Sheet 1
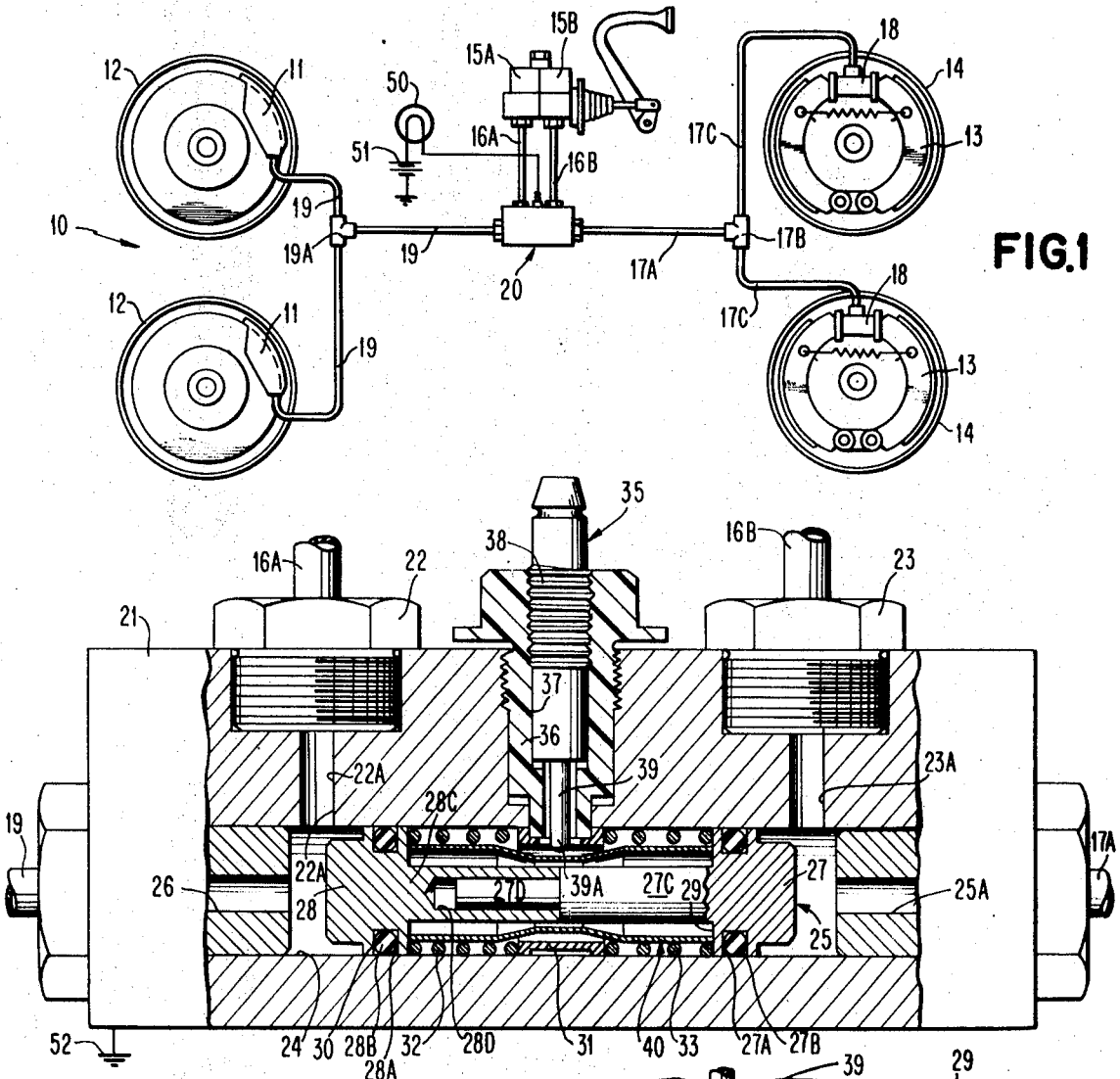
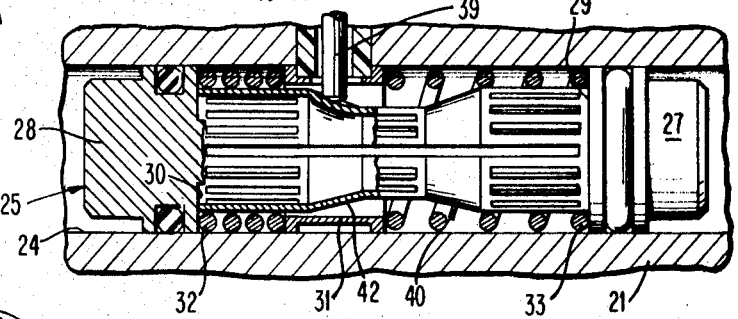
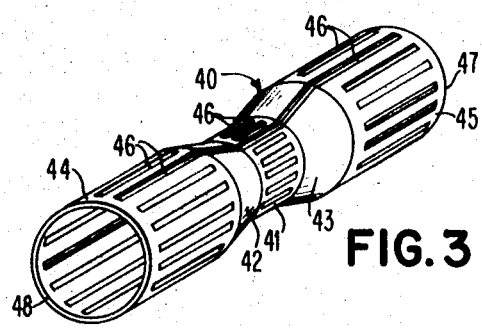
INVENTOR
ROGER E. DOERFLER
BY William J. Dick
ATTORNEY

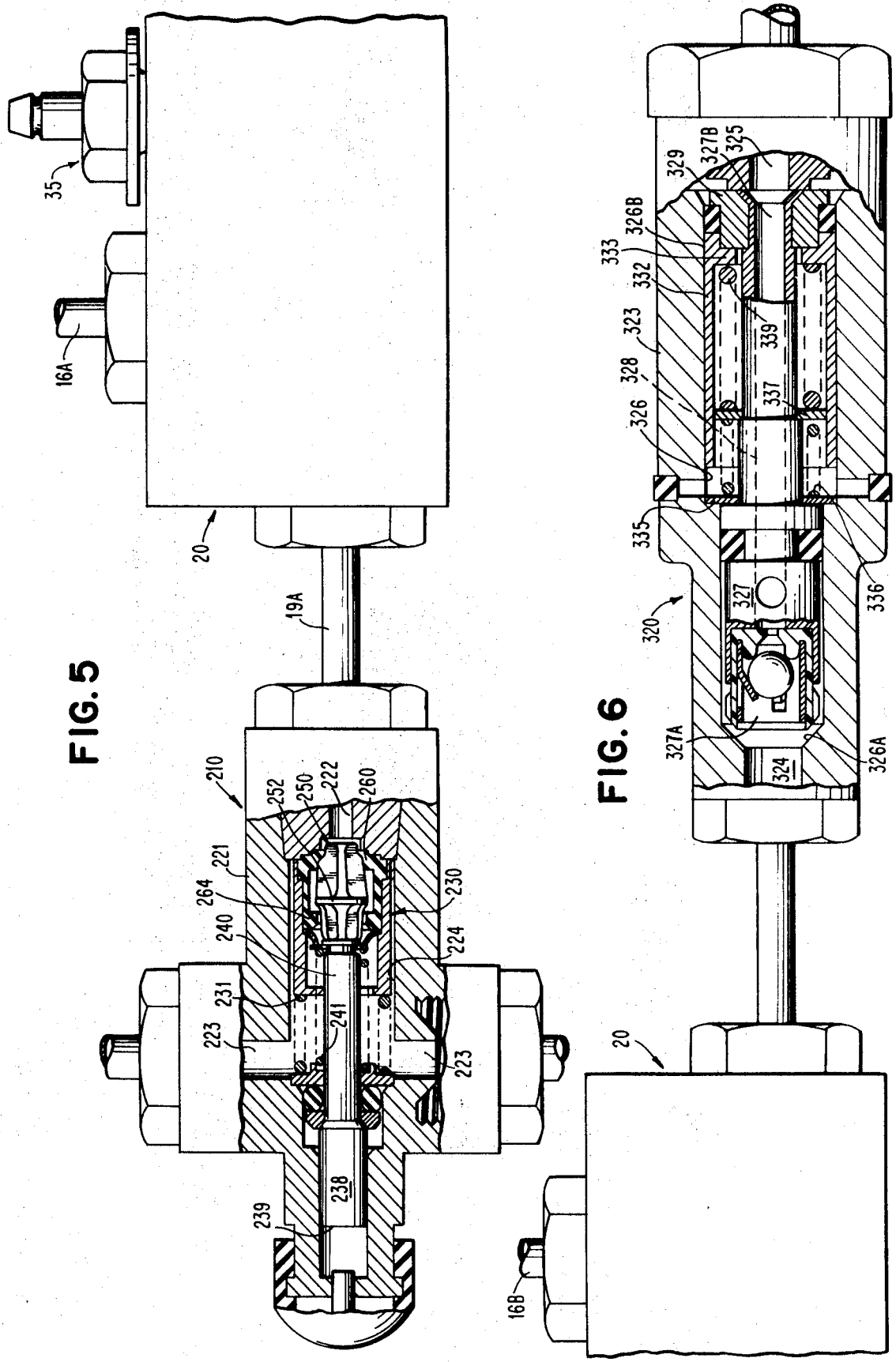

Sept. 20, 1971    R. E. DOERFLER    3,606,486
BRAKE INDICATING SAFETY VALVE
Filed Oct. 28, 1969    4 Sheets-Sheet 3

United States Patent Office 3,606,486
Patented Sept. 20, 1971

3,606,486
BRAKE INDICATING SAFETY VALVE
Roger E. Doerfler, Baltimore, Md., assignor to
Hydrasearch Co., Inc., Annapolis, Md.
Filed Oct. 28, 1969, Ser. No. 871,844
Int. Cl. B60t 11/34, 17/22
U.S. Cl. 303—6C                                      8 Claims

ABSTRACT OF THE DISCLOSURE

This patent discloses a pressure differential or brake indicating safety valve particularly adapted for use in hydraulic brake systems having dual master brake cylinders. The valve is adapted for use on motor vehicles having either all shoe, all discs, or hybrid (a brake system having disc brakes on one set of wheels and shoe brakes on the other set of wheels) brake systems. The pressure differential valve includes a tubular body having an axially extending bore and mounted therein pressure responsive means which are slidably disposed in the bore. First and second hydraulic fluid inlets are connected respectively to opposite ends of the pressure responsive means and the inlets, or other apertures in communication therewith, may be connected by conventional hydraulic piping to the front and rear brakes respectively of the brake system, and to the outlets of the dual master cylinder. Switch means are mounted in the housing and switch actuating means are carried by the pressure responsive means, there being indicating means, in the present instance lights and the like, connected to the switch means. In addition, there are means for maintaining the switch actuating means in its actuated position upon a predetermined pressure differential occurring between the first and second inlets which causes the switch actuating means to engage the switch means. The valve is adapted to receive a metering valve, or a proportioning valve, or a combination of each without necessitating major modification.

SUMMARY OF THE INVENTION AND STATE OF THE ART

The present invention relates to a pressure differential valve particularly adapted for hydraulic brake systems, and more particularly relates to a pressure differential valve for hydraulic brake systems having dual master cylinders.

With the advent of the dual master cylinder requirements (and dual brake systems) as set forth by the U.S. Government Regulations concerning automotive manufacturers, it is necessary that some indication be made when one or the other of the brake systems loses pressure. Additionally, it is necessary that in the event of one system failure, the driver of the motor vehicle has adequate warning of the same even when his foot is removed from the pedal. Conventionally, in dual master cylinder brake systems presently in existence, the warning of a malfunction in one or the other of the brake systems (i.e. the forward or rear brake systems) will only be displayed when the motor vehicle operator is energizing the dual master cylinder. Unfortunately, when the motor vehicle operator is bringing his vehicle to a halt, it is difficult if not impossible for him to remove his eyes from the road ahead to glance at the dash. Additionally, if the warning system is de-energized upon his coming to a halt, it is of no avail to the operator for he does not and will not know of a brake system defect until at some later time he happens to glance at the dash when he is braking or notices that the vehicle is being braked by only two of its four wheels.

In some systems it is desirable to meter and/or proportion the hydraulic pressure to one or the other of the brake systems either singly or in combination depending upon weight distribution, load distribution and the type of brake system employed, i.e. disc or shoe. On automotive vehicles having disc brakes, braking pressure is developed almost immediately upon hydraulic pressure being communicated to the disc brakes. Because of the linkage and heavy return springs inherent with shoe or drum type brakes, a considerable hydraulic pressure must be applied prior to the shoe engaging the drum. Thus in hybrid brake systems having front disc and rear shoe or drum type brakes, if the fluid pressure from the master cylinder is not delayed or metered to the front disc brakes the front brakes will be actuated prior to the rear shoe type brakes, which premature actuation is not only dangerous but can result in increased wear in the front brake system. A typical metering valve which may be used to meter or delay the master cylinder pressure to the front disc brakes is shown in the U.S. patent to Doerfler, No. 3,447,836.

Another variable is found in a hybrid type brake system or in a brake system on a vehicle having uneven weight distribution, which variable must be accounted for. It has been found that shoe type brakes tend to lock upon brake pressure increasing above a certain pressure depending upon vehicle weight and loading conditions. On the other hand, disc brakes may be subjected to greatly increased pressure without locking. However, it is necessary when bringing the vehicle to a complete stop as rapidly as possible to increase brake pressure in a steady manner, and thus it is desirable to do so without a locking of the shoe type brakes, or in the event of all shoe brakes to prevent the rear brakes from locking because of less weight at the rear of the motor vehicle. Accordingly, it is vital that an additional valve be placed intermediate the master cylinder and shoe type brakes, which additional valve will proportion the pressure beyond a certain predetermined pressure so that the rate of increase of hydraulic pressure to the shoe type brakes is less than the pressure increase rate to the disc type brakes. Such a valve design is shown in the U.S. patent to Doerfler No. 3,304,130.

Valves that have both a metering and a proportioning function so that the outlet to the front disc type brakes is metered while the outlet to the rear shoe type brakes is proportioned have been designed, for example see Doerfler Pat. No. 3,365,243 as well as the aforementioned patent to Doerfler No. 3,304,130.

To this end, and in view of the above, it is a principal object of the present invention to provide a valve operative to indicate hydraulic pressure differences at different inlets while retaining its output signal even upon inlet pressure removal until both inputs receive substantially the same pressure increase over zero system pressure.

Stlil another object of the present invention is to provide a brake indicating safety valve for a vehicular hydraulic brake system which may be particularly adapted for all disc, all shoe or hybrid systems, at the user's option.

Still another object of the present invention is to provide in a valve of the instant type, means for latching the valve in one position to give a signal output indicating input pressure failure, such signal continuing until the cause of the pressure failure has been corrected.

Still another object of the present invention is to provide a novel brake indicating safety valve operative in conjunction with a metering and proportioning valve, the metering valve being actuated by one master brake cylinder and the proportioning valve being actuated by a second master brake cylinder, each valve being separated one from the other by the indicating safety valve but incorporated in such a manner that the failure of either one of the master cylinders or brake systems will still permit the remaining master cylinder and wheel or brake pair to be fully operative in order that the vehicle may be brought safely to a halt by the operator.

Yet another object of the present invention is to provide a novel brake indicating safety valve which, upon loss of brake pressure from one or the other of the master cylinders, will automatically reset itself upon restoration of brake pressure in the defective system without tampering with the brake indicating safety valve in any manner.

Other objects and a fuller understanding of the invention may be had by referring to the following specification and claims taken in conjunction with the accompanying drawings in which:

FIG. 1 is a schematic view of an exemplary hybrid hydraulic brake system embodying the novel valve of the present invention;

FIG. 2 is an enlarged fragmentary side elevational view of one form of the novel pressure differential valve of the present invention as illustrated in FIG. 1;

FIG. 3 is an enlarged perspective view illustrating an element of the valve of the present invention;

FIG. 4 is a fragmentary side elevational view showing the valve of FIG. 2 and the element of FIG. 3 in a position indicating failure of one of the master brake cylinders shown in FIG. 1;

FIG. 5 is a fragmentary enlarged sectional view of the valve of the present invention shown in conjunction with a metering valve for metering hydraulic pressure to the front brakes of the system;

FIG. 6 is a fragmentary enlarged view of a valve of the present invention incorporating a proportioning valve to proportion the hydraulic pressure to the rear brakes upon a certain finite pressure being reached;

Figure 7:
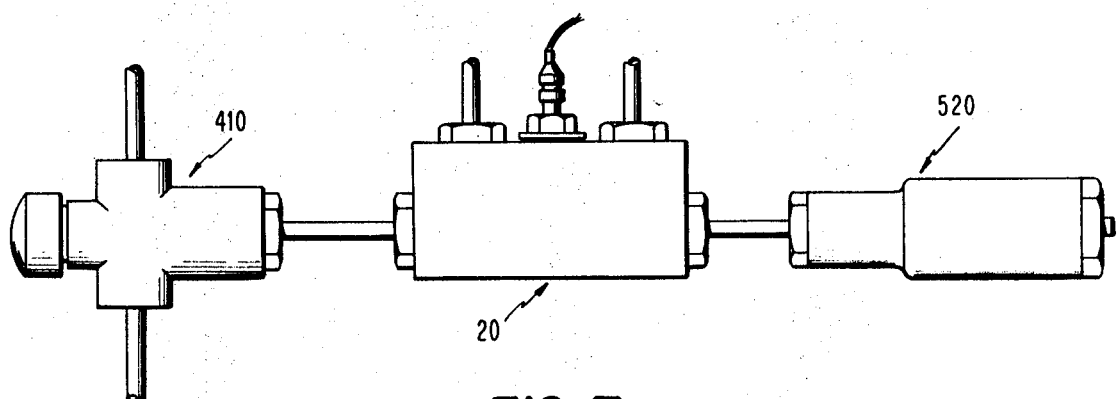
FIG. 7 illustrates the valve of the present invention in conjunction with both a metering and a proportioning valve similar to that shown in FIGS. 5 and 6.

Referring now to the drawings, and especially FIG. 1, a hybrid brake system 10 is schematically illustrated therein, comprising, in the present instance, caliper type disc brakes 11 mounted on front wheels 12 and shoe type brakes 13 mounted on rear wheels 14. As is conventional, a foot-actuated hydraulic pressure source, in the present instance comprising a pair of master cylinders 15A and 15B, is connected via hydraulic piping 16A, 16B to a novel pressure differential and brake indicating safety valve 20 of the present invention. Emanating from the novel valve 20 is hydraulic piping 17A which leads to a T 17B and then through hydraulic piping 17C to hydraulic cylinders 18 associated with the shoe type brakes 13. In a like manner, emanating from the valve 20 is hydraulic piping 19 which is connected to the caliper type disc brakes 11 mounted on the front wheels 12 through a T 19A.

At the outset it should be recognized that the valve of the present invention is adapted for use with any hydraulic brake system having more than one hydraulic pressure source, and the invention is not limited to use with a hybrid hydraulic brake system, albeit the example system shown in FIG. 1 is hybrid.

In accordance with the invention the pressure differential or brake indicating safety valve of the present invention warns the driver of a motor vehicle when a hydraulic pressure loss occurs, whether it be the front or rear brake system, and maintains this indication until the pressure has been restored. To this end, the pressure differential and brake indicating safety valve 20 includes a tubular body or housing 21 having a first inlet 22 for receiving hydraulic pressure from a first pressure source, such as the piping 16A and associated master cylinder 15A, and a second inlet 23 for receiving hydraulic pressure from a second hydraulic pressure source such as the hydraulic piping 16B and master cylinder 15B. Interiorly of the body or housing 21 is an axially extending bore 24 in which is slidably mounted pressure responsive means 25 which is movable in response to pressure differentials between the first and second inlets 22 and 23 respectively. As illustrated, the inlet 22 is connected to the bore 24 as by a conduit 22A, while the inlet 23 in a similar manner is connected to the bore 24 as by a conduit 23A. As shown in FIG. 2, the bore 24 also communicates with outlets 25A and 26 connected respectively to the hydraulic piping 17A and 19. Positioned intermediate the inlets 22 and 23 is switch means 35, in the present instance centrally located intermediate those aforementioned inlets and having an active and inactive state. Connected to the pressure responsive means 25 is switch actuating means 40 in the present instance composed of a flexible material for maintaining the switch actuating means 40 in contact with the switch means 35 (in its active state) upon a predetermined pressure differential existing between the first and second inlets 22 and 23. In its active state the switch actuating means 40 engages the switch means 35. As best shown in FIG. 1, the switch actuating means 35 is connected to teller means, in the present instance a light 50, which is connected to a suitable voltage source 51 (such as the car battery) and then to chassis ground. In a like manner, the body or housing 21 of the valve 20 is also connected to ground as at 52 (see FIG. 2). This simple circuit shows that upon actuation of the switch means 35, the circuit is completed and the teller means is actuated. It should be recognized that the teller means may take any form capable of permitting perception by the driver, i.e. lights, buzzer, etc.

In order that the pressure responsive means 25 may respond adequately, in a manner to be more fully described hereinafter, to pressure differentials across the valve, means preferably comprising first and second pistons 27 and 28 having circumferentially extending grooves 27A, 28A for retaining sealing rings 27B, 28B are provided. Each of the pistons 27, 28 includes an axially extending base portion 27C, 28C which cooperate with one another so as to permit relative movement therebetween, in the present instance the piston 27 having a projection 27D which slidingly cooperates with a receptacle 28D in the base 28C of the piston 28.

As best shown in FIG. 2, circumscribing the base portions 27C, 28C of the pistons 27, 28 is the switch actuator means 40, in the present instance the switch actuator means comprising a cylinder having a medial reduced diameter or neck-down central portion 41 which by way of sloping conical portions 42 and 43 merges into enlarged diameter end portions 44, 45. The cylinder is preferably composed of a flexible but resilient material such as thin metal and includes relieved portions, such as slots and the like 46 to enhance the flexibility and resiliency of the metal. As illustrated, in FIG. 2 the cylindrical switch actuator means 40 has opposite terminal ends 47 and 48 which abut the radial inner walls 29 and 30 of the pistons 27 and 28 respectively.

Figure 8:
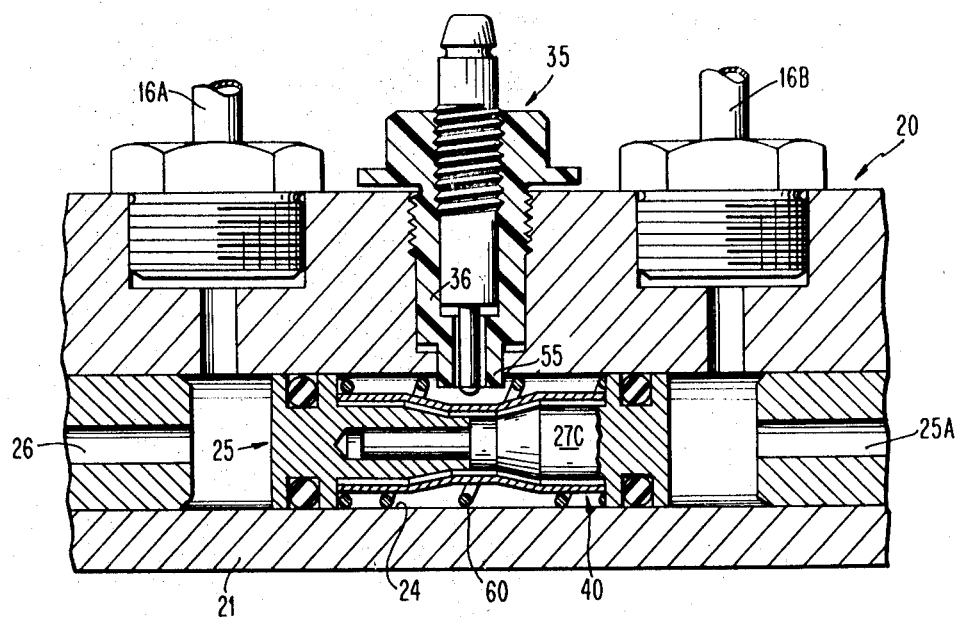
FIG. 8 is a fragmentary sectional view of another form of the valve of the present invention.

In the embodiment illustrated in FIG. 2, a ring 31 acts as a keeper or a hold-down for the switch means 35, but as will be shown in the embodiment illustrated in FIG. 8, may or may not be utilized depending upon the economics of the valve structure desired. However, in the present instance, a biasing compression spring 32 is positioned intermediate the wall 30 of the piston 28 and the ring 31 while a biasing compression spring 33 is positioned intermediate the wall 29 and the ring 31, the springs tending to displace or separate the pistons 27 and 28. It is preferable that these springs, when in the position shown in FIG. 2, be of insufficient spring pressure to cause such a separation for reasons which will become apparent hereinafter.

The switch means 35 includes an insulator 36 which is threaded into the housing or body 21, and includes a stepped bore 37 into which is positioned a metal pin 39 threaded into the insulator 36 as at 38. As illustrated in FIG. 2, the pin 39 is inserted into the insulator until its lowermost end 39A projects into the bore 24.

Assuming substantially equal pressure from the master cylinders 15A, 15B, as pressure is increased to the front and rear brake systems the pressure responsive means 25 will assume the position shown in FIG. 2. If there is any tendency for the springs 32, 33 to tend to separate the pistons 27 and 28, increased pressure at the inlets 22 and 23 will cause the pistons 27 and 28 to move towards one another. Assuming a pressure failure, for example a brake in the rear brake line 17A, or the master cylinder 15B failing, unequal pressure between the inlets 22 and 23 results in the pressure responsive means 25 shifting away from the pressure, in the present instance to the right as shown in FIG. 4. As the pressure responsive means moves towards the lowest pressure the spring 32 is compressed while the spring 33 is extended. Additionally, the switch actuator means 40 is carried by the pressure responsive means until it engages the projecting portion 39A of the pin 39. As the switch actuator means 40 is moved, the pin slides up the sloping conical portion 42 and due to the flexibility of the material of the cylinder, it is indented and engaged by the projecting portion 39A retaining the actuator means 40 in the actuated position. Upon release of hydraulic pressure from both the master cylinders 15A and 15B, due to the spring 32 having been compressed as described above, the piston 28 moves to the left into its original, rest, or first position. However, due to the crushing and wedging action of the pin 39 against the switch actuator means 40, the switch actuator means is latched by the pin thus maintaining the piston 27 in its actuated or far right position separated from the piston 28, the projection 27D still being inserted, however, in the receptacle 28D.

Because the switch actuator means is composed preferably of a conductive material, and because the housing 21 is connected to ground as at 52, the circuit is completed and the light 50 stays on. Thus the light will stay on even after de-energization or all pressure has been removed from the inlets 22 and 23. However, upon curing the defect, hydraulic pressure at the inlet 23 (as well as at the inlets 22) will cause the piston 27 to move to the left, the wall 29 bearing against the terminal end 47 of the cylinder causing the pressure responsive means to be restored to its neutral, rest or first position shown in FIG. 2. Of course, disengagement of the projecting pin 39 from the cylinder causes power to be removed from the light 50, de-energizing the light.

The embodiment of the valve of the present invention illustrated in FIG. 8 is much the same as has heretofore been described, and thus like parts of the valve have been given like numbers. The principal difference in the valve 20 illustrated in FIG. 8, and the valve of FIG. 2, is the use of a single spring 60. As illustrated, the spring circumscribes the switch actuator means 40 and engages, on opposite sides, the insulator 36, a portion 55 of which projects into the bore 24. In this manner, the spring 60 acts in the same manner as the two springs 32 and 33, the projecting portion 55 of the insulator 36 serving the same purpose as the ring 31. In all other respects the valve illustrated in FIG. 8 operates as the valve 20 described in FIGS. 2–4.

Another variation of the present invention is illustrated in the embodiment of FIG. 9, once again, for purposes of simplicity, like parts have been given like numbers. The principal difference in the embodiment of FIG. 9 and that of FIGS. 2 and 8 lies in the switch means 135. As before, the switch means 135 includes an insulator 136 which is threaded into the bore 124. A ring 131 is positioned in the bore and acts as a receiver for the insulator 136. A pin 137 having a shoulder 138 engageable with a shoulder 138A of the insulator 136 for determining the lowest position of the pin 137, includes a depending pin projection 139 which overlies the medial portion 141 of the switch actuator means 140, and projects into the bore 124. Additionally, it is noted that the pin 137 is slidable in the insulator 136, that is movable therein, but is preferably biased downwardly by, for example, a spring (not shown).

Upon loss of hydraulic pressure, for example at the inlet 123 while inlet 122 has a hydraulic pressure increase, the pressure responsive means 125 will move to the right, the pin 139 being cammed upwardly as by the sloping conical portion 142 of the switch actuator means 140. Upon this occurring, the pin 137 moves upwardly closing the contacts of a switch 149 completing the circuit between the voltage source 151 and the indicator light 150.

Figure 9:
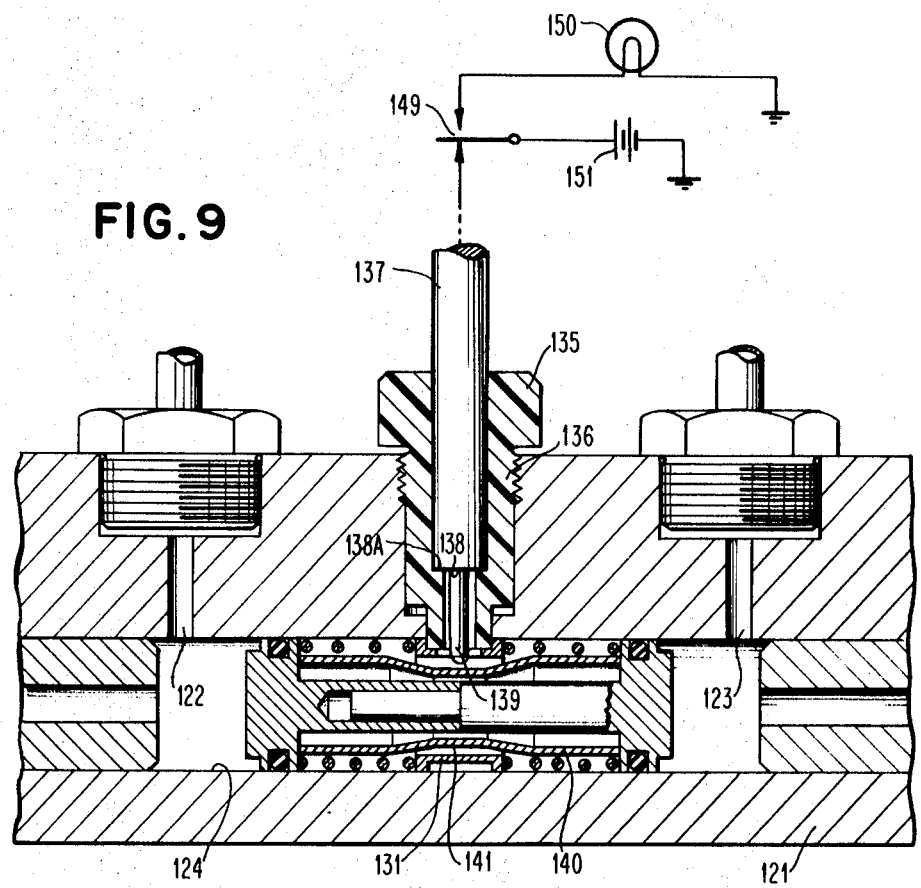
FIG. 9 is a fragmentary sectional view of still another embodiment of the present invention.
Figure 10:
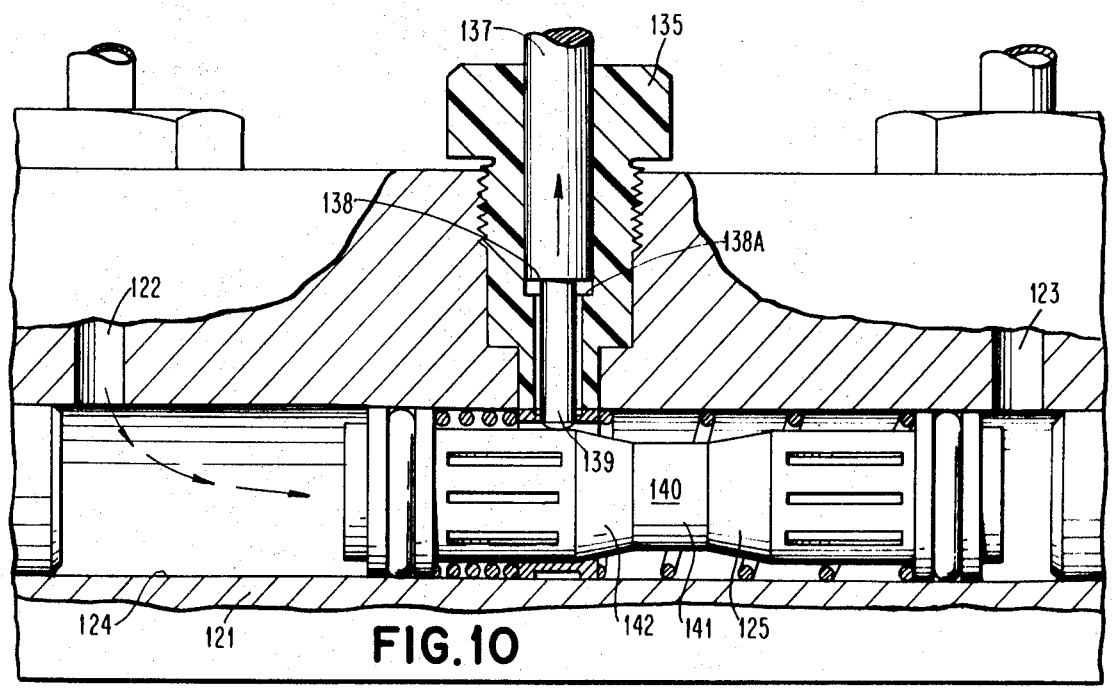
FIG. 10 is an enlarged fragmentary view of the apparatus shown in FIG. 9 but in a position wherein one of the master brake cylinders or brake systems has failed.

It is noted that the system illustrated in FIGS. 9 and 10 does not require that the body 121 be grounded. Additionally, the switch actuating means 140 may be composed of a thin plastic and the pin 137 may be composed of a nonconductive material.

In certain instances it is desirable to incorporate a metering valve in the hydraulic brake system in order to prevent premature energization of the front disc brakes, in for example, a hybrid type brake system. Such a valve is shown in the Doerfler Pat. No. 3,447,836 issued on June 3, 1969. In these instances the valve 20, in any of the forms heretofore described, is illustrated as being connected to a metering valve 210 identical to that shown in the aforementioned U.S. patent. Although that patent sets forth the metering valve in great detail, its operation will be briefly explained herein. Referring to FIG. 5, the outlet 26, instead of being directly connected to the hydraulic piping 19 may be connected via hydraulic piping 19A to the inlet 222 of the valve 210. The metering valve 210 permits free passage of hydraulic fluid between the master cylinder 15A and the caliper type disc brakes 11 until a first level of hydraulic pressure is communicated to the disc brakes, and thereafter the valve is caused to be shutoff until a second level of pressure is reached at which time the hydraulic pressure is applied by the master cylinder to the disc brakes. As shown in FIG. 5, the valve includes a valve body 221 and a bore 224 which connects the inlet 222 to a pair of outlets 223 which are connected to the hydraulic piping. The valve 210 therefore replaces the T 19A shown in FIG. 1 interiorly of the bore 224 is slidable spool means 230 including a spring 231 which urges the tubular spool 230 toward the inlet 222. Also mounted interiorly of the bore 224 is plunger means 238 one end 239 of which is exposed to atmospheric pressure the other end 240 of which extends into the tubular spool 230, the plunger being normally urged towards the inlet by a spring 241 closely wound on the plunger. Loosely connected at one end of the plunger is poppet means 250 which includes a closure element 252 which divides the poppet along its axial length. Both sides of the closure element 252 are axially fluted. Circumscribing the poppet is a popet retainer 260, the poppet retainer being composed of a resilient material which operates to bias the poppet valve away from the inlet 222. At the opposite end of the retainer 260 is an inwardly projecting annular seal 264 which projects towards the axis of the poppet a sufficient distance to permit engagement with the closure element 252 on the poppet upon a certain predetermined pressure being reached.

In operation, initially fluid enters the inlet 222, flows around the fluted poppet valve 250 until it passes out the outlets 223. As pressure increases, the plunger 238 gradually moves to the left causing the poppet valve 250 to move to the left until the sealing element 264 engages the closure element 252. At that point no further fluid pressure increase is given to the outlet 223. Thereafter, upon the pressure attaining a second predetermined level, the tubular spool 230 moves to the left against a large spring 231 permitting the poppet retainer 60 to move with it and allowing hydraulic pressure to pass around the exterior of the spool 230 to the outlet 223. For a much more detailed description of operation, U.S. Pat. No. 3,447,836 should be alluded to.

In certain instances, for example when utilizing shoe brakes on one set of wheels and disc brakes on another set of wheels, it is desirable to proportion the fluid reaching the shoe brakes upon hydraulic pressure reaching a certain predetermined amount. The reason for this is that the shoe brakes tend to lock much faster than do disc type brakes and therefore the disc brakes can receive much more pressure before locking than can the shoe type brakes. Additionally, with the dual type master cylinders and split or dual brakes systems, if the one set of brakes happens to become defective, it would be desirable for the other set of brakes to be effective and for the proportioning effect to be overcome. To this end, a proportioning valve which has a dual proportioning ratio and which is schematically shown in FIG. 6 is illustrated in applicant's co-pending patent application S.N. 822,170 filed on May 6, 1969, the pertinent portions of this specification being herein incorporated by reference. However, for purposes of clarification, a brief description of the dual ratio proportioning valve will be provided. As shown in FIG. 6, the pressure differential valve 20 may be connected as at outlet 25 of a dual ratio proportioning valve 320 as by hydraulic piping or the like. This proportioning valve 320 proportions and programs the sequential operation of the hydraulic pressure to, in the illustrated instance, the shoe brakes by hydraulic imbalance. The valve comprises a valve body 323 having a hydraulic fluid inlet 324 and a hydraulic fluid outlet 325 communicated by a stepped bore 326. Slidably mounted in the bore 326 is a spool 327, the spool having an inlet end 327A and an outlet end 327B and movable between a first (rest) position to the right and a second sealing position to the left. As shown, the bore 326 includes a chamber 326A which circumscribes and houses the inlet end 327A of the spool 327 and a counterbore portion 326B circumscribing the after or outlet end 327B of the spool. The spool also includes a central conduit or passageway 328 which permits fluid communication between the inlet 324 and the outlet 325 during initial pressure increases at the inlet. At the right hand end of the spool is a first piston 329 which is connected to the spool, while circumscribing the spool is a second piston 332, the second piston having an inwardly and radially extending flange 333 for butting engagement with the first piston 329. As shown the piston 332 has a forward terminal end which is spaced from a washer 335 which engages the body interiorly of the bore 326. Intermediate this washer 335 and a second disc or washer 337 is a spring 336 which constitutes the first closure pressure-forming means, while the spring 339 (heavier construction) intermediate the second washer 337 and the flange 333 constitutes the means which forms the second breakpoint. It is noted at this point that the diameter of the spool 327 at the inlet is not as great as the diameter of the spool at the outlet. In operation, as pressure builds up at the inlet, the increased diameter of the piston at the outlet causes the spool 327 to move to the left compressing spring 336. Proportioning will continue at this rate until the inlet pressure reaches a second level at which time the second piston 332 compresses the spring 339 sufficiently to cause engagement of the piston against the washer 335. At that point the second piston diameter is no longer considered and one may consider that the only diameter being exposed to hydraulic fluid is the diameter of the first piston 329, which diameter is much less than the diameter of the second piston and accordingly a new proportioning ratio is set. Of course, for a more detailed description, the aforementioned co-pending application should be considered.

It should be recognized that while the metering valve 210 may be used in conjunction with the valve of the present invention, and the proportioning valve 320 may also be used in conjunction with the valve 20, as illustrated in FIG. 7, a metering valve 410 identical to that described relative to the valve 210 and a proportioning valve 520 identical to the valve 320 may be utilized with the valve 20 of the present invention.

Thus the valve of the present invention permits instant and accurate information to be transmitted to the operator of a motor vehicle in the event of failure of one of the brake systems, which information will remain until the cause of the problem has been corrected.

What is claimed is:

1. A hydraulic brake system for automotive type vehicles, said system comprising a dual master cylinder having separate outlets; a pressure differential valve, said valve including a valve body having first and second inlets connected to said dual master cylinder said first and second hydraulic inlets of said pressure differential valve being connected to a bore extending interiorly of said valve body; a pair of pistons oppositely and slideably disposed in said bore, sealing means cooperating with said pistons and bore and sealing said first inlet from said second inlet; and means biasing said pistons apart; switch actuating means comprising an axially extending cylinder circumscribing at least a portion of said pistons and displaceable therewith; switch means having an active and inactive state and mounted in said valve; said switch means positioned relative to said cylinder so as to be inactive when the hydraulic pressure at said inlets is substantially the same, and engageable with said cylinder and in an active state when a hydraulic imbalance occurs between said inlets; and teller means actuated by said switch means and indicating such an imbalance, and means to maintain said teller means actuated until said hydraulic balance is restored; at least a first and second brake means and means connecting said separate outlets respectively to said separate brake means.

2. A hydraulic brake system for automotive type vehicles in accordance with claim 1 including proportioning valve means between said first brake means and one of said outlets of said dual master cylinder.

3. A hydraulic brake system for automotive type vehicles in accordance with claim 2 including metering valve means intermediate said second brake means and another of said outlets of said dual master cylinder.

4. A hydraulic brake system for automotive type vehicles in accordance with claim 1 including metering valve means intermediate said second brake means and one of said outlets of said dual master cylinder.

5. A hydraulic brake system for automotive type vehicles in accordance with claim 1 wherein said cylinder has a medial reduced diameter portion, and enlarged diameter end portions; said medial portion merging into said end portions by conical shaped portions.

6. A hydraulic brake system for automotive type vehicles in accordance with claim 5 wherein said switch means includes a pin projecting into said bore and overlying said medial portion of said cylinder when said pistons are in hydraulic balance, and in contact with said cylinder when a hydraulic imbalance occurs between said inlets.

7. A hydraulic brake system for automotive type vehicles in accordance with claim 6 wherein said cylinder is composed of a resilient conductive material, said pin and body being composed of a conductive material, and an insulator means insulating said pin from said body.

8. A hydraulic brake system for automotive type vehicles in accordance with claim 7 including means in said body for receiving said pin, said pin being slidably disposed therein.

References Cited
UNITED STATES PATENTS

| | | | |
|---|---|---|---|
| 870,806 | 11/1907 | Turner | 303—84 |
| 2,239,348 | 4/1941 | Wirtanen et al. | 200—82(3) |
| 2,979,365 | 4/1961 | Jones | 303—84(A) |
| 3,427,582 | 2/1969 | Brandon | 303—84(A)UX |
| 3,464,741 | 9/1969 | Falk | 303—6(C) |
| 3,472,559 | 10/1969 | Bueler | 303—6(C) |
| 3,480,333 | 11/1969 | Stelzer | 303—6(C) |

FOREIGN PATENTS

| | | | |
|---|---|---|---|
| 813,553 | 5/1959 | Great Britain | 200—82(3) |

MILTON BUCHLER, Primary Examiner

J. J. McLAUGHLIN, Assistant Examiner

U.S. Cl. X.R.

60—54.5E; 188—151A, 349; 200—82D; 303—84A; 340—52C